(12) United States Patent
Nobuchika et al.

(10) Patent No.: US 7,770,618 B2
(45) Date of Patent: Aug. 10, 2010

(54) PNEUMATIC TIRE WITH ELECTRICALLY CONDUCTIVE HELICAL PATH

(75) Inventors: Hideo Nobuchika, Kobe (JP); Mamoru Uchida, Kobe (JP); Youjirou Miki, Kobe (JP); Syuichi Yamamori, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 837 days.

(21) Appl. No.: 11/645,650

(22) Filed: Dec. 27, 2006

(65) Prior Publication Data

US 2007/0163690 A1    Jul. 19, 2007

(30) Foreign Application Priority Data

Dec. 28, 2005    (JP)    ............................. 2005-379519

(51) Int. Cl.
  *B60C 13/00* (2006.01)
  *B60C 19/08* (2006.01)
  *B29D 30/60* (2006.01)
  *B29D 30/72* (2006.01)

(52) U.S. Cl. .............. 152/152.1; 152/525; 152/DIG. 2; 156/130.7

(58) Field of Classification Search ............... 152/152.1, 152/DIG. 2, 525; 156/130.7
See application file for complete search history.

(56) References Cited

U.S. PATENT DOCUMENTS 2,339,546 A * 1/1944 Hanson ............... 152/DIG. 2 X
6,576,077 B1 * 6/2003 Mitsuhashi et al. ... 156/130.7 X
6,923,879 B1 * 8/2005 Blickwedel et al. ... 156/130.7 X
2002/0074077 A1 * 6/2002 Ikeda et al. ........... 156/130.7 X
2002/0088529 A1 * 7/2002 Ogawa et al. ......... 156/130.7 X
2005/0103412 A1   5/2005 Zanzig et al.
2005/0173041 A1 * 8/2005 Miki ......................... 152/525
2007/0000585 A1 * 1/2007 Uchida et al. ............. 152/152.1

FOREIGN PATENT DOCUMENTS

| FR | 1.279.913 A |    | 12/1961 |
| FR | 1.546.488 A |    | 11/1968 |
| JP | 53-147302 A |    | 12/1978 |
| JP | 9-71112 A   |    | 3/1997  |
| JP | 2004136808 A | * | 5/2004  |

* cited by examiner

*Primary Examiner*—Adrienne C Johnstone
(74) *Attorney, Agent, or Firm*—Birch, Stewart, Kolasch & Birch, LLP

(57) ABSTRACT

A pneumatic tire is provided with an electrically conductive path extending continuously from a position in the rim contacting surface to a position in the ground contacting surface through a sidewall portion, wherein a sidewall rubber is a high-performance rubber compound and almost-insulative, having a volume resistivity of not less than $1 \times 10^8$ ohm cm. The electrically conductive path includes a helical path made of an electrically conductive rubber having a volume resistivity of not more than $1 \times 10^7$ ohm cm. The helical path is disposed axially inside the sidewall rubber and extends spirally around the tire rotational axis. Preferably, the tread rubber, clinch rubber and carcass topping rubber are also almost-insulative high-performance rubber compounds.

8 Claims, 4 Drawing Sheets

PNEUMATIC TIRE WITH ELECTRICALLY CONDUCTIVE HELICAL PATH

BACKGROUND OF THE INVENTION

Field of the Invention

The present invention relates to a pneumatic tire provided with an electrically conductive path for discharging static electricity.

DESCRIPTION OF RELATED ART

In order to improve the rolling resistance and wet grip performance of a pneumatic tire, the use of a silica-rich rubber compound has been proposed, for example in Japanese patent application publication JP-A-09-071112. In the case of the silica-rich rubber compounds, however, the electric resistance of the vulcanized rubber becomes very high, and almost insulative. In this proposition, therefore, in order to discharge static electricity to the ground through the tread portion, as shown in FIG. 8, the tread rubber (a) is provided with a double layered structure comprising an outer layer (b) of a silica-rich compound and an inner conductive layer (c) of a carbon-rich compound. And the inner conductive layer (c) is provided with grounding parts (c1) penetrating the outer layer (b) to the tread surface (as).

In recent years, on the other hand, there is a pressing need to reduce oil consumption by automobiles. Accordingly, it is very important for tire manufactures to improve tire performance, especially the rolling resistance of the tires.

BRIEF SUMMARY OF THE INVENTION

It is therefore, an object of the present invention to provide a pneumatic tire in which, even if almost-insulative high-performance rubbers such as silica-rich compounds are used as the sidewall rubber, the entirety of the tread rubber and preferably more, the electric resistance of the tire is reduced so that static electricity of the vehicle body can be discharged from the wheel rim to the ground through the bead, sidewall and tread of the tire.

According to the present invention, a pneumatic tire comprises: a tread portion having a ground contacting surface; a pair of bead portions each having a rim contacting surface; a pair of sidewall portions extending between the tread portion and bead portions; and an electrically conductive path extending continuously from a position in the rim contacting surface to a position in the ground contacting surface through one of the sidewall portions, wherein a sidewall rubber having a volume resistivity of not less than $1 \times 10^8$ ohm cm, is disposed in the above-mentioned one of the sidewall portions to define an outer surface of the sidewall portion, the electrically conductive path includes a helical path made of an electrically conductive rubber having a volume resistivity of not more than $1 \times 10^7$ ohm cm, and the helical path is disposed axially inside the sidewall rubber and extends spirally around the tire rotational axis.

In this specification, the volume resistivity means a value measured with an ohm meter ADVANTESTER 8340A under the following conditions: applied voltage 500 v, temperature 25 degrees C. and humidity 50%, using a specimen of 15 cm×15 cm×2 mm.

The ground contacting surface means that in a normally inflated loaded condition of the tire.

The rim contacting surface means that in a normally inflated unloaded condition of the tire.

Here, the normally inflated loaded condition is such that the tire is mounted on a standard wheel rim and inflate to a standard pressure and loaded with a standard tire load. The normally inflated unloaded condition is such that the tire is mounted on the standard wheel rim and inflate to the standard pressure but loaded with no tire load. The standard wheel rim is a wheel rim officially approved for the tire by standard organization, i.e. JATMA (Japan and Asia), T&RA (North America), ETRTO (Europe), STRO (Scandinavia) and the like. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like. In case of passenger car tires, however, the standard pressure is uniformly defined by 180 kPa.

BRIEF DESCRIPTION OF THE DRAWINGS

Embodiments of the present invention will now be described in detail in conjunction with the accompanying drawings, in which.

DETAILED DESCRIPTION OF THE INVENTION

Figure 1:
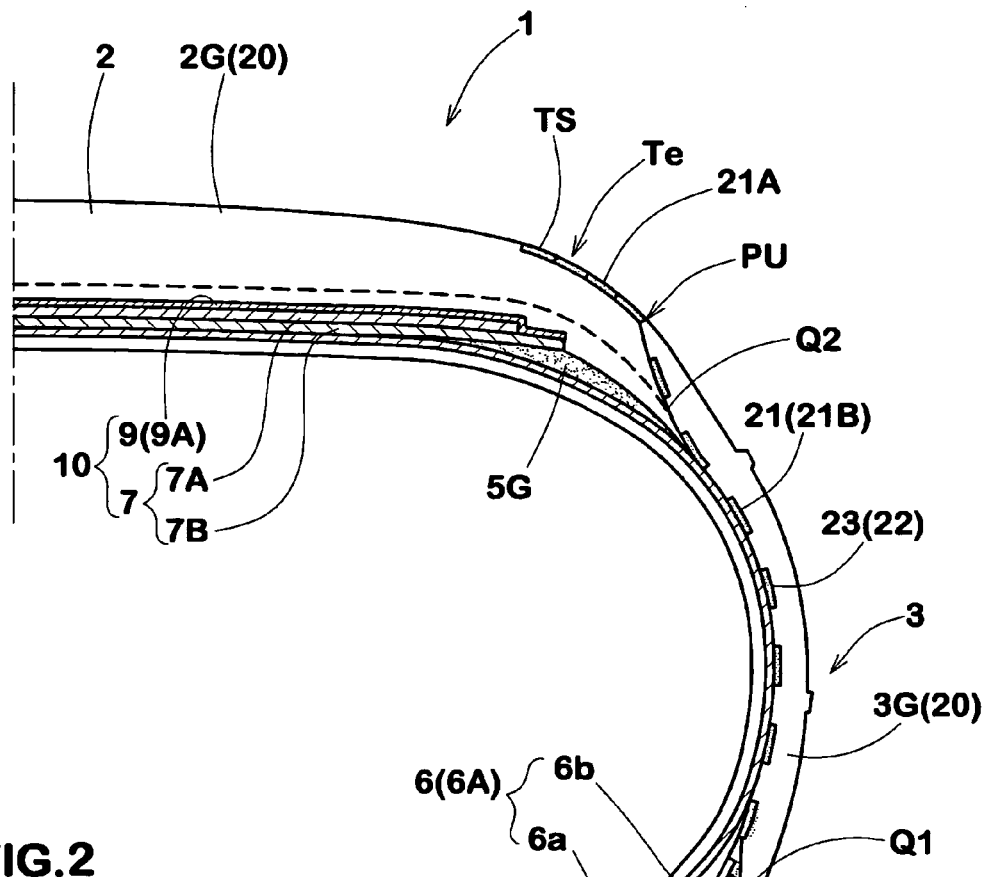
FIG. 1 is a cross sectional view of a pneumatic tire according to the present invention.

In the drawings, pneumatic tire 1 according to the present invention comprises a tread portion 2, a pair of sidewall portions 3, and a pair of axially spaced bead portions 4. In FIG. 1, there is shown the pneumatic tire 1 mounted on a wheel rim R and inflated to a normal pressure. As usual, to reinforce the tire, a carcass 6 is disposed to extend between the bead portions 4 through the tread portion 2 and sidewall portions 3. A bead core 5 is disposed in each of the bead portions 4. A belt 10 is disposed in the tread portion 2.

Further, various rubber components are disposed, which include:

a tread rubber 2G disposed radially outside the carcass 6 to define a part of the tire outer surface in the tread portion;

a sidewall rubber 3G disposed axially outside the carcass 6 to define a part of the tire outer surface in each of the sidewall portions: and a clinch rubber 4G disposed in each of the bead portions to define an axially outer surface and bottom surface of the bead portion 4.

The carcass 6 is composed of at least one ply 6A of rubberized cords arranged radially at an angle in the range of from 70 to 90 degrees with respect to the tire equator, extending between the bead portions 4 through the tread portion 2 and sidewall portions 3 and turned up around the bead core 5 in each bead portion 4 from the axially inside to the axially outside of the tire to form a pair of turnup portions 6b and a main portion 6a therebetween. In this embodiment, the carcass 6 is composed of a single ply 6A of cords arranged radially at an angle of 90 degrees with respect to the tire equator.

Between the main portion 6a and turned up portion 6b, there is disposed a bead apex 8. The bead apex 8 is made of hard rubber extending radially outwards from the radially outside of the bead core 5, while tapering towards its radially outer end.

The belt 10 is disposed between the tread rubber 2G and the crown portion of the carcass 6. The belt 10 comprises a breaker 7 and/or a band 9. In this example, the tread reinforcing belt 10 is composed of a breaker 7 disposed on the carcass 6 and a band 9 disposed on the breaker 7.

The breaker 7 comprises at least two cross plies 7A and 7B of rubberized cords laid at an angle of 15 to 40 degrees with respect to the tire circumferential direction. In this example, the breaker 7 consists of the two cross plies 7A and 7B.

The band 9 is composed of at least one ply 9A of at least one rubberized cord wound spirally at an angle of not more than 5 degrees with respect to the tire circumferential direction. In this example, the above-mentioned at least one ply 9A is a full-width ply extending over the entire width of the breaker. In other words, the band 9 consists of a full-width ply. But, it is also possible to employ the band consisting of an edge ply made up of axially spaced pieces covering the axial edges of the breaker 7, or the band consisting of a combination of the full-width ply and the edge ply.

The tread rubber 2G is disposed on the radially outside of the belt. In the tire axial direction, the tread rubber 2G extends beyond the axial edges of the belt, abutting on a cushion rubber 5G, and the axial edges reach to a sidewall upper portion. Here, the cushion rubber 5G tapers toward its axially inner and outer end, and the axially inner end is sandwiched between the carcass and the belt.

The above-mentioned clinch rubber 4G is a wear-resistant high-modulus rubber extending along the outer surface of the tire from the beat toe to a position radially outward of the radially outer end of the rim flange through the bead heel. Therefore, the clinch rubber 4G has a bottom part 4G1 extending along the bottom surface of the bead portion 4 so as to contact with the bead seat of the wheel rim R when the tire is mounted thereon, and an axially outer part 4G2 extending along the axially outer surface of the bead portion so as to contact with the flange of the wheel rim R when mounted.

The sidewall rubber 3G is a flexible relatively low-modulus rubber. The radially outer end thereof is spliced with the axially outer end of the tread rubber 2G. The radially inner end is also spliced with the radially outer end of the above-mentioned clinch rubber 4G. In this example, as shown in FIG. 1, in the splice junctions, the sidewall rubber 3G covers the tread rubber 2G and clinch rubber 4G. The boundary Q2 between the tread rubber 2G and the sidewall rubber 3G extends radially inwardly from a point PU on the outer surface of the tire towards the carcass 6.

The boundary Q1 between the sidewall rubber 3G and the clinch rubber 4G extends radially outwardly from a point PL on the outer surface of the sidewall portion towards the carcass 6.

At least the tread rubber 2G and sidewall rubber 3G are almost-insulative rubber compounds 20. The almost-insulative rubber compound 20 means that it has a volume resistivity of not less than $1\times10^8$ ohm cm when vulcanized.

In the embodiment shown in FIG. 1, the clinch rubber 4G and the topping rubber of the carcass cords are also almost-insulative rubber compounds 20.

Figure 2:
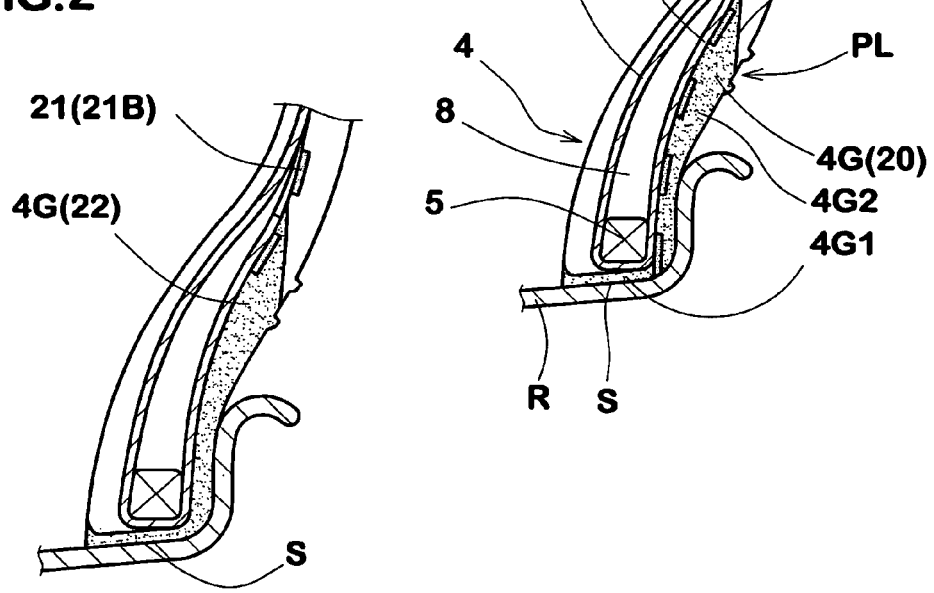
FIG. 2 is a cross sectional view of the bead portion of another example of the pneumatic tire according to the present invention.

In another embodiment shown in FIG. 2, the clinch rubber 4G is a conductive rubber compound 22, but the topping rubber of the carcass cords is an almost-insulative rubber compound 20. The conductive rubber compound 22 means that its has a volume resistivity of not more than $1\times10^7$ ohm cm when vulcanized.

In any case, there is provided a conductive path 21 extending continuously from a surface contacting with the wheel rim R to a surface contacting with the ground.

According to the present invention, the conductive path 21 includes a helical path 21B which extends around the tire rotational axis through the sidewall portion.

In this example, used as the almost-insulative rubber compounds 20 are high-silica rubber compounds in which the carbon content is decreased to a value in a range of from 0 to 15 parts by weight with respect to 100 parts by weight of base rubber.

The electrically conductive rubber compounds 22 are high-carbon rubber compounds in which the carbon content is more than 15 parts by weight with respect to 100 parts by weight of base rubber.

As to the base rubber, for example, natural rubber (NR), butadiene rubber (BR), emulsion polymerized styrene-butadiene rubber (E-SBR), solution styrene butadiene rubber (S-SBR), polyisoprene rubber (IR), nitrile rubber (NBR), chloroprene rubber (CR) and the like can be used alone or in combination.

The silica content is determined according to the required characteristics and performance, but usually about 20 to 100 parts by weight of silica is used with respect to 100 parts by weight of base rubber.

In view of rubber reinforcing effect and rubber processability, it is preferable for the silica mixed in the compound 20 that: the BET surface area determined from nitrogen adsorption is in a range of from 100 to 200 sq.m/g; and the dibutyl phthalate (DBP) oil absorption is in a range of not less than 150 ml/100 g; and further it show colloidal characteristic. For the silane coupling agents, vis(triethoxysilylpropyl) tetrasulfide, alpha-mercaptpropyltrimethoxysilane or the like is preferably used.

In the rubber compounds 20 and 22, additives, e.g. vulcanizing agent, vulcanization accelerator, coagent, softener and the like can be added according to need.

By using such a high-silica rubber compound as the tread rubber 2G, the rolling resistance and wet grip performance of the tire can be improved. By using such a high-silica rubber compound as the sidewall rubber 3G and carcass topping rubber, the rolling resistance can be further improved.

However, aside from the high-silica rubber compounds, according to the required tire performance, various rubber compounds may be used as insulative rubber compounds 20 and conductive rubber compounds 22. For example, a high-silica rubber compound to which an ionic conductor, e.g. lithium salt and the like is added in order to decrease the volume resistivity under $1\times10^7$ ohm cm may be used as a conductive rubber compound 22.

In the embodiment shown in FIG. 1 wherein the clinch rubber 4G is almost-insulative, the helical path 21B is extended to the bead bottom surface S.

In the embodiment shown in FIG. 2 wherein the clinch rubber 4G is conductive, the helical path 21B terminates between the radially outer part of the clinch rubber 4G and the carcass 6 although it may be extended to the bead bottom surface S, otherwise this embodiment is the same as the above embodiment.

Figure 3:
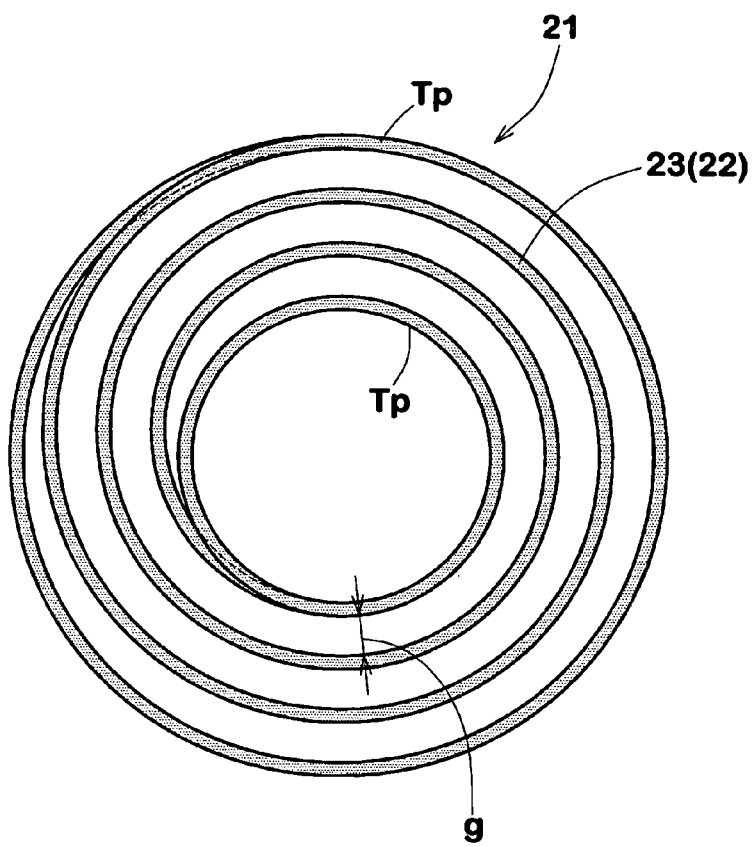
FIG. 3 shows an example of the conductive path viewed from one side of the tire.

The helical path 21B is, as shown in FIG. 1 and FIG. 3, formed by spirally winding at least one rubber tape 23. The rubber tape 23 is made from an electrically conductive rubber compound 22 and has a volume resistivity of not more than $1\times10^7$ ohm cm when vulcanized. Preferably, the rubber tape 23 has a width of 5 to 30 mm and a thickness of 0.5 to 2.0 mm, and it is desired the cross-sectional area is substantially maintained after the tire is vulcanized.

In the tread portion 2, it is preferable that the tape makes at least one turn when the number of the wound tape 23 is one because the tape 23 can always contact with the ground. In FIG. 1, the tape 23 is closely wound four turns around the tread edge Te, and at least one of them exists within the ground contacting surface so as to form a ground contacting part.

To always contact with the ground is preferable, but it is also possible to provide discharging points Dp discontinuously around the tire because static electricity build during tire rotating can be discharged every contact between the discharging points Dp and the ground.

Figure 4:
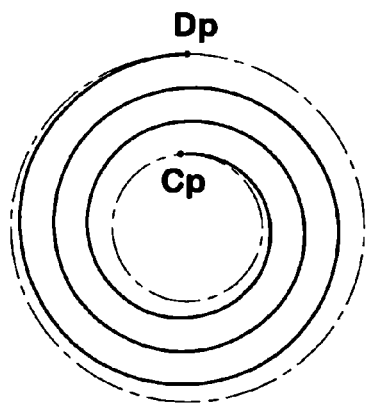
FIGS. 4 and 5 schematically show other examples of the conductive path.

FIG. 4 shows an example wherein a singe discharging point Dp is formed on each side of the tire, and the discharging point Dp on one side of the tire is shifted from that on the other side by 180 degrees around the tire rotational axis, whereby the static electricity discharging is possible every 180 degrees during tire rotating.

Figure 5:
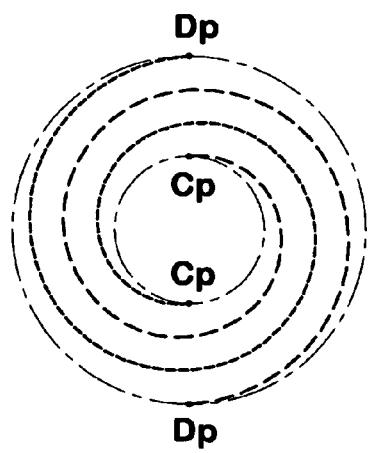

FIG. 5 shows another example wherein two tapes 23 are spirally wound from different (equiangular) starting potions (Cp) to different (equiangular) ending potions (Dp). In this example, the starting potions (Cp) are sifted from each other by 180 degrees, and the ending potions (Dp) are also sifted from each other by 180 degrees because two tapes 23 are used on each side of the tire. In this case too, similarly to the FIG. 4 example, the discharging points Dp on one side is shifted from those on the other side by 90 degrees around the tire rotational axis, whereby the static electricity discharging is possible every 90 degrees during tire rotating.

In the bead portions 4, on the other hand, there are two modes:

the tape(s) 23 is (are) extended to the surface which can always contact with the wheel rim R when the tire is mounted thereon (FIG. 1 embodiment); and the tape(s) 23 is (are) connected to a conductive rubber component which can always contact with the wheel rim R when the tire is mounted thereon (FIG. 2 embodiment).

As in the embodiment shown in FIG. 1, when the clinch rubber 4G and the topping rubber of the carcass cords are almost-insulative rubber compounds 20, the helical tape(s) 23 is (are) extended to the bottom surface s or axially outer surface of the bead portion which can contact with the wheel rim's bead seat and flange, respectively. The bead bottom surface S will be preferable to the axially outer surface because the contact pressure is higher.

In this case too, when the number of the wound tape is one, it is preferable that the tape 23 makes at least one turn as shown in FIG. 3 in order to ensure a good contact with the wheel rim R. However, it is also possible to eliminate such a turned portion Tp as shown in FIGS. 4 and 5.

As in the embodiment shown in FIG. 2, when the clinch rubber 4G is a conductive rubber compound 22 but the topping rubber of the carcass cords is an almost-insulative rubber compound 20, it is preferable that the helical tape(s) 23 is (are) terminated at and connected to the axially inner surface of the clinch rubber 4G.

In this case, it is not necessary that the tape makes at least one turn. It is enough to merely terminate as shown in FIGS. 4 and 5 as far as the tape is electrically connected with the conductive clinch rubber 4G.

Figure 6:
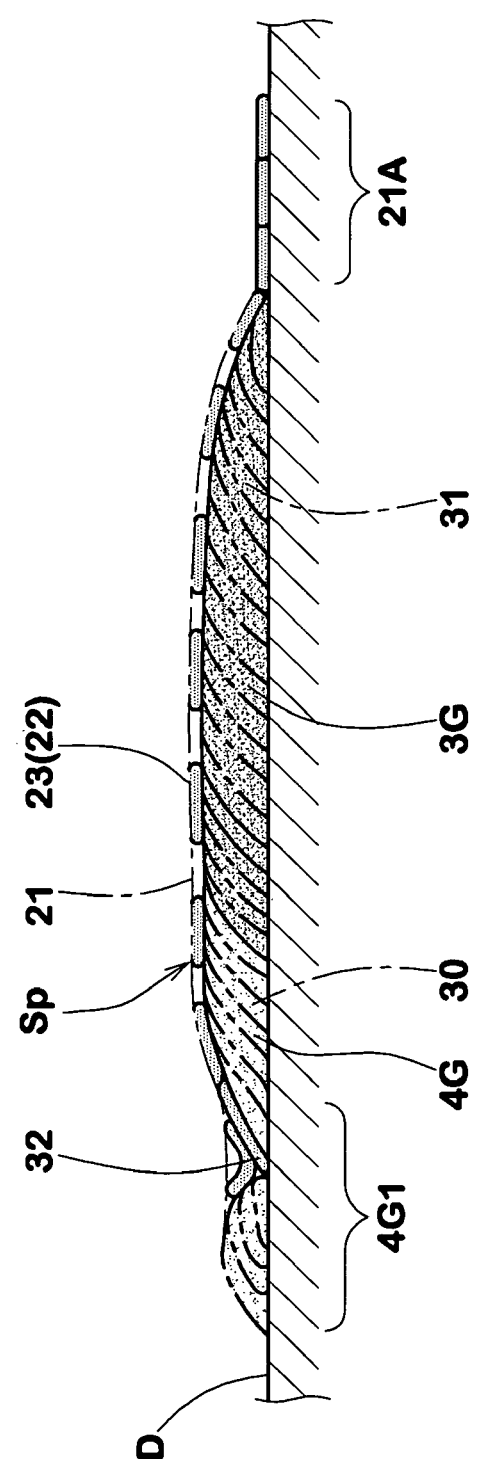
FIG. 6 is a cross sectional view for explaining a method for making the conductive path.

FIG. 6 shows a method for making the conductive path 21.

Firstly, a raw sidewall rubber 3G and a raw clinch rubber 4G are wound on a tire building drum D.

In this example, the raw clinch rubber 4G and raw sidewall rubber 3G are each formed by overlap winding a raw rubber tape 30, 31 around the tire building drum D. These raw rubber tapes 30, 31 are made of the insulative rubber compounds 20 as explained above. In order to insert the conductive path, the raw clinch rubber 4G is provided at the position in the bottom part 4G1 with a gap 32 which is in this example, a gap between windings of the tape 30.

Secondary, the above-mentioned raw rubber tape 23 is spirally wound continuously from the gap 32 to a position beyond the sidewall rubber 3G as shown in FIG. 6. Therefore, the conductive path 21 is formed on a part of the raw clinch rubber 4G and the entirety of the raw sidewall rubber 3G and on the surface of the drum (part 21A) by the raw conductive rubber compound 22.

Incidentally, it is also possible that, a conventional wider and thicker extruded rubber strip is used as the raw clinch rubber 4Gn and/or the raw sidewall rubber 3G, instead of the narrow width rubber tape 30, 31. In the case of the embodiment shown in FIG. 2, the gap 32 is not formed, and the tape 23 starts from a position Sp on the raw clinch rubber 4G.

The assembly of the raw sidewall rubber 3G, raw clinch rubber 4G and raw rubber tape 23 (conductive path 21) is applied to the troidal carcass around which the belt 10 and tread rubber 2G are set in advance. Thus, passing through between the sidewall rubber 3G and carcass 6, the rubber tape 23 extends radially outwardly, and as shown in FIG. 1. At the radially inner end of the boundary Q2 between the tread rubber and the sidewall rubber, the rubber tape 23 turns off the carcass 6 and extends along the boundary Q2. At the radially outer end of the boundary Q2, the rubber tape is exposed to the outside of the tire, and then, turns towards the axially inside so as to extend along the tire outer surface into the ground contacting surface TS. Thus, the exposed part 21A is formed, which includes: a part located within the ground contacting surface TS; and a part located outside ground contacting surface TS and starting from the radially outer end of the boundary Q2. On the other hand, in FIG. 1, the rubber tape 23 extends radially inwardly along the carcass 6 and, at the bead bottom, penetrates through the clinch rubber 4G so that the radially inner end is exposed to the outside of the tire to thereby form a rim contacting part.

In this embodiment, as shown in FIG. 3, between the spiral windings, a spacing (g) is formed in at least the sidewall portions, which spacing is almost same or wider than the width of the tape 23. But it is also possible to make the spacing zero or to overlap the windings of the tape.

Further, as a modification, it may be possible to form the conductive path 21 on one side of the tire.

Comparison Tests

Figure 7:
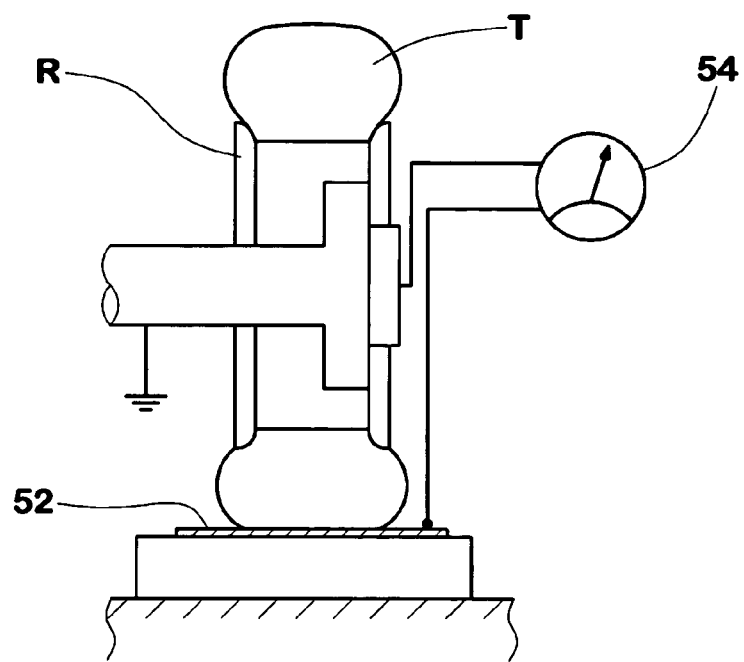
FIG. 7 is a diagram for explaining a method for measuring the electric resistance of a tire.
Figure 8:
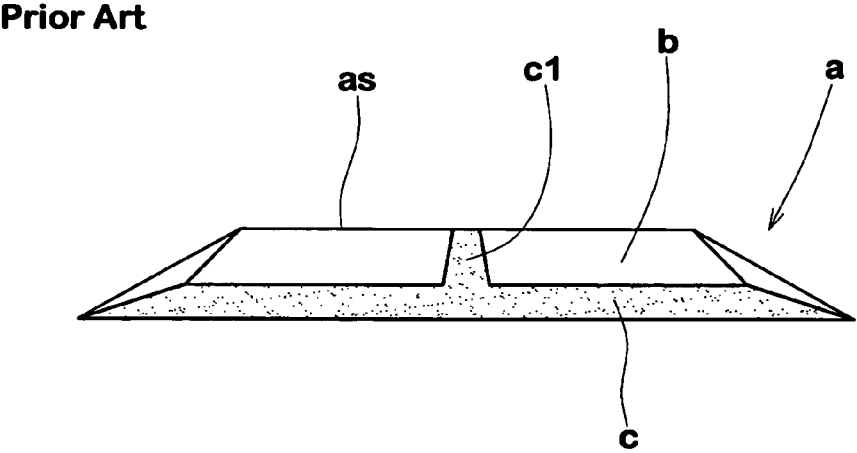
FIG. 8 is a cross sectional view for explaining the tread rubber of the prior art tire.

Pneumatic tires of size 225/55R16 (wheel rim size 16×7JJ) having the basic structure shown in FIG. 1 were manufactured, and the electric resistance of each tire was measured according to the procedure specified by JATMA. specifically, as shown in FIG. 7, the electric resistance between an aluminum-alloy wheel rim R on which the tire T is mounted and a conductive metal board 52 on which the tire was put, was measured with an ohm meter 54 under the following conditions: applied voltage 1000 V; atmospheric temperature 25 deg. C.; humidity 50%; tire pressure 200 Kpa; and vertical tire load 5.3 kN (80% of the maximum load).

The results are shown in Table 1.

The conductive path was formed with a conductive rubber compound comprising 100 parts by weight of natural rubber as the base rubber, and 30 parts by weight of carbon to have a volume resistivity of $2.2 \times 10^6$ ohm cm.

In the tires Ref. and Exs. 1-3, the tread rubber, sidewall rubber, clinch rubber and carcass topping rubber were formed with insulative rubber compounds each comprising 100 parts by weight of natural rubber as the base rubber, and 30 parts by weight silica to have a volume resistivity of more than $1 \times 10^8$ ohm cm. In the tire Exs. 4-7, the tread rubber, sidewall rubber and carcass topping rubber were the same as the tires Ref. and Exs. 1-3, but the clinch rubber was formed with a conductive rubber compound to have a volume resistivity of $3.2 \times 10^6$ ohm cm. Except for these specifications and those in Table 1, the test tires had the same specifications.

TABLE 1

|  | Tire | | | | | | | |
| --- | --- | --- | --- | --- | --- | --- | --- | --- |
|  | Ref. 1 | Ex. 1 | Ex. 2 | Ex. 3 | Ex. 4 | Ex. 5 | Ex. 6 | Ex. 7 |
| Helical path | none | | | | | | | |
| Width W (mm) | — | 20 | 20 | 20 | 20 | 20 | 20 | 20 |
| Thickness t (mm) | — | 1.0 | 1.0 | 2.0 | 1.0 | 2.0 | 1.0 | 1.0 |
| Spacing g (mm) | — | 0 | 20 | 20 | 20 | 20 | 30 | 0 |
| Clinch rubber *1 | insu | insu | insu | insu | con | con | con | con |
| Bead portion *2 | FIG. 1 | FIG. 1 | FIG. 1 | FIG. 2 | FIG. 2 | FIG. 2 | FIG. 2 | |
| Tire electric resistance ($\times 10^8$ ohm) | 3.8 | 0.02 | 0.03 | 0.02 | 0.02 | 0.02 | 0.02 | 0.01 |

*1 insu: insulative, con: conductive
*2 FIG. 1: the tape 23 penetrated the clinch rubber to the bead bottom surface. FIG. 2: the tape 23 terminated in the radially outer end portion of the clinch rubber.

The invention claimed is:

1. A pneumatic tire comprising
a tread portion having a ground contacting surface,
a pair of bead portions each having a rim contacting surface,
a pair of sidewall portions extending between the tread portion and bead portions, and
an electrically conductive path extending continuously from a position in the rim contacting surface to a position in the ground contacting surface through one of the sidewall portions, wherein
a sidewall rubber having a volume resistivity of not less than $1 \times 10^8$ ohm cm, is disposed in said one of the sidewall portions to define an outer surface of the sidewall portion,
said electrically conductive path includes a helical path made of an electrically conductive rubber having a volume resistivity of not more than $1 \times 10^7$ ohm cm, and the helical path is disposed axially inside said sidewall rubber and extends spirally around the tire rotational axis, the sidewall rubber is formed by overlap winding a rubber tape, and
the helical path is formed by spirally winding a rubber tape so that in the sidewall portion a positive gap is formed between the windings.

2. The pneumatic tire according to claim 1, wherein
a clinch rubber having a volume resistivity of not less than $1 \times 10^8$ ohm cm, is disposed in one of the bead portions to define said rim contacting surface, and
the helical path is extended to the rim contacting surface so as to form a rim contacting part.

3. The pneumatic tire according to claim 2, wherein
a tread rubber having a volume resistivity of not less than $1 \times 10^8$ ohm cm, is disposed in said tread portion to define said ground contacting surface, and
the helical path is extended to the ground contacting surface so as to form a ground contacting discharging part.

4. The pneumatic tire according to claim 1, wherein
a clinch rubber having a volume resistivity of not more than $1 \times 10^7$ ohm cm, is disposed in one of the bead portions to define said rim contacting surface and to form a part of said conductive path, and
the helical path is connected to the clinch rubber.

5. The pneumatic tire according to claim 4, wherein
a tread rubber having a volume resistivity of not less than $1 \times 10^8$ ohm cm, is disposed in said tread portion to define said ground contacting surface, and
the helical path is extended to the ground contacting surface so as to form a ground contacting discharging part.

6. The pneumatic tire according to claim 1, wherein a tread rubber having a volume resistivity of not less than $1 \times 10^8$ ohm cm, is disposed in said tread portion to define said ground contacting surface, and the helical path is extended to the ground contacting surface so as to form a ground contacting discharging part.

7. The pneumatic tire according to claim 6, wherein
said ground contacting discharging part is continuous in the tire circumferential direction.

8. The pneumatic tire according to claim 1, wherein
said electrically conductive path includes a plurality of the helical paths.

* * * * *